March 5, 1957
W. G. PATRIQUIN
2,783,859
SHOCK ABSORBER WITH COMPRESSION STOP
Filed Dec. 16, 1954
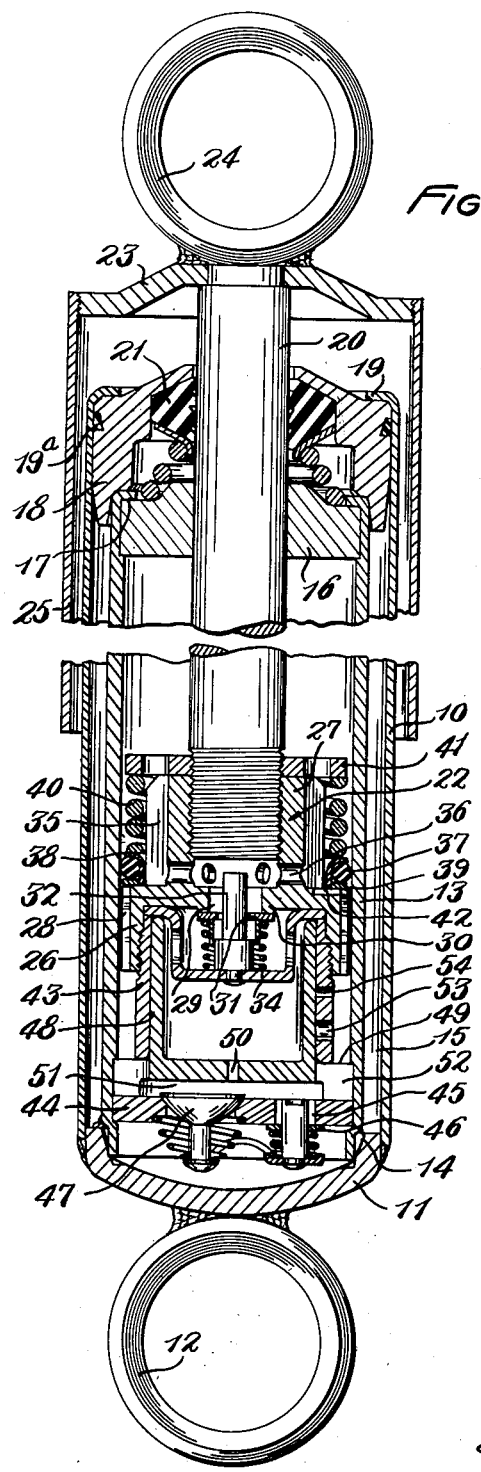
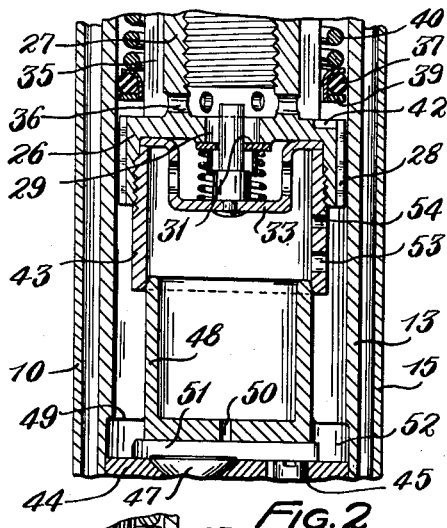
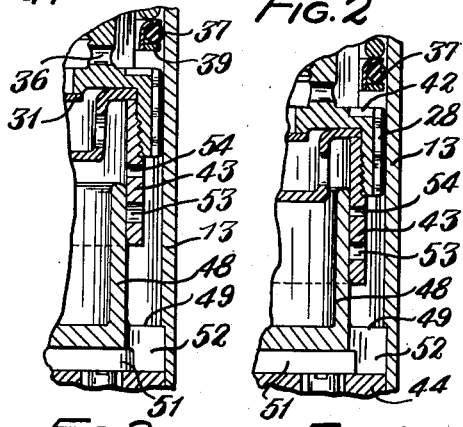
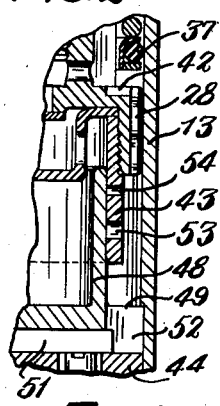
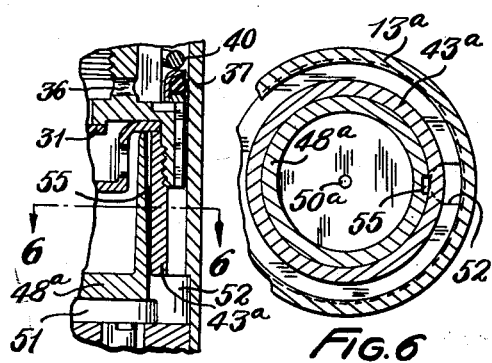
Fig. 1
Fig. 2
Fig. 3
Fig. 4
Fig. 5
Fig. 6
INVENTOR.
WILLIAM G. PATRIQUIN
BY Hudson, Creighton,
Williams, David & Hoffmann
ATTORNEYS

United States Patent Office 2,783,859
Patented Mar. 5, 1957

2,783,859

SHOCK ABSORBER WITH COMPRESSION STOP

William G. Patriquin, Willoughby, Ohio, assignor to The Gabriel Company, Cleveland, Ohio, a corporation of Ohio Application December 16, 1954, Serial No. 475,796

11 Claims. (Cl. 188—88)

This invention relates to a direct double acting hydraulic shock absorber and more particularly to the inclusion in such a shock absorber of a combined hydraulic combination compression stop and rebound delay mechanism.

Although shock absorbers embodying the invention are susceptible of various uses in different environments for purposes of illustration the shock absorber embodying the invention will be described herein as of a type particularly adapted for use on motor vehicles.

An object of the invention is to provide in a direct double acting hydraulic shock absorber an improved and novel hydraulic compression stop mechanism effective to produce during at least a portion of the compression or impact stroke of the piston of the shock absorber additional hydraulic resistance to the movement of the piston.

Another object is to provide a hydraulic compression stop mechanism as referred to in the first object and which mechanism performs the additional function of a rebound delay effective during the rebound or expansion stroke of the piston of the shock absorber to control the initial rebound resistance to such piston movement.

Another object is to provide a hydraulic compression stop and rebound delay mechanism as referred to in the preceding objects and which mechanism is an integral part of the direct double acting hydraulic shock absorber.

A still further object is to provide by a hydraulic compression stop and rebound delay mechanism for a direct double acting hydraulic shock absorber, the additional resistance desired during the impact or compression stroke of the piston and which resistance can be controlled as to duration of stop action by providing a predetermined length for the functional cooperation of the stop elements of the mechanism and by a predetermined selection of the location of the bleed holes in such elements, and wherein the total resistance created by the mechanism can be regulated by a predetermined selection of the total area of the bleed holes provided in the elements and wherein the rate of speed at which the additional resistance builds up can be regulated by a predetermined selection as to size, number and location of the bleed holes provided in the cooperating stop elements of the mechanism.

A still further and important object is to provide in a direct double acting hydraulic shock absorber a hydraulic compression stop and rebound delay mechanism which is so constructed that no additional hydraulic pressure is imposed on the walls of the working or pressure chamber of the shock absorber.

Further and additional objects and advantages of the invention not hereinbefore specifically referred to will become apparent hereinafter in the detailed description of embodiments of the invention which is to follow and which embodiments are illustrated in the accompanying drawing forming a part of this specification and wherein:

Fig. 1 is a longitudinal sectional view through a direct double acting hydraulic shock absorber in which the hydraulic compression stop and rebound delay mechanism of the invention is included as an integral part of the shock absorber construction, the parts of the shock absorber being illustrated in the fully collapsed position at the end of the maximum impact or compression stroke of the piston of the shock absorber.

Fig. 2 is a fragmentary longitudinal sectional view through the shock absorber of Fig. 1 but illustrating the relationship of the parts at an intermediate point in the compression or impact stroke of the shock absorber piston and showing the cooperating stop elements of the mechanism as just starting their functional engagement or cooperation.

Fig. 3 is a view similar to Fig. 2 but illustrates the relationship of the stop elements of the mechanism when the piston of the shock absorber has moved farther in its impact or compression stroke from the position shown in Fig. 2.

Fig. 4 is a view similar to Fig. 3 but illustrates the relationship of the stop elements of the mechanism when the piston has moved still farther in its impact or compression stroke from the position it had in Fig. 3.

Fig. 5 is a fragmentary sectional view similar to Fig. 1 but illustrating a modified form of hydraulic compression stop and rebound delay mechanism embodying the invention, and Fig. 6 is a transverse sectional view through the shock absorber of Fig. 5 and is taken substantially on line 6—6 of Fig. 5 looking in the direction of the arrows.

Referring to Figs. 1 to 4 inclusive of the drawing, the direct double acting hydraulic shock absorber shown therein and embodying the invention is of the telescopic type and includes an outer cylinder 10 having attached to one end thereof by suitable means such as by welding, a cap 11 provided with an attaching eye 12 whereby this end of the shock absorber can be attached to the axle of a vehicle by means well known in the art.

An inner cylinder 13 is concentrically disposed in radially spaced relationship within the cylinder 10 and said cylinder 13 constitutes the working or pressure chamber of the shock absorber as will later become apparent. One end of the inner cylinder 13 engages the cap 11 and is secured thereto, it being noted that said cap 11 is provided with circularly spaced grooves 14 which place the space defined by the cap 11, the cylinder 13 and a compression head later to be described in communication with the annular space 15 intermediate the cylinders 10 and 13 and constituting the reservoir of the shock absorber as will be well understood in the art.

The upper end of the working or pressure cylinder 13 is closed by a closure plug 16 that bears upon an annular shoulder in the cylinder 13 while the outer end of the cylinder 13 is spun over the plug 16 as indicated at 17. A closure cap 18 bears against the inwardly spun end 17 of the cylinder 13 and fits within the outer cylinder 10 with the latter being spun over the cap 18 as indicated at 19.

A suitable sealing gasket 19a on the periphery of the cap 18 engages the interior of the cylinder 10 to seal the end of the cylinder 10. A piston rod 20 passes through an opening in the cap 18 and through a spring pressed conical gasket 21 housed in the cap 18 and then through a central opening in the closure plug 16 and into the working or pressure chamber formed by the cylinder 13.

The inner end of the piston rod 20 has threadedly connected to it a piston 22 which will later be described in greater detail. The outer end of the piston rod 20 is rigidly connected to a cap 23 provided on its outer side with an attaching eye 24 by which the piston rod can be secured to the frame of a motor vehicle as will be well understood in the art. A sleeve guard or shield 25 has one of its ends threadedly connected to the cap 23 and surrounds the outer cylinder 10 in concentric radially spaced relationship thereto.

The piston 22 has an inverted cup-shaped portion 26 and a tubular portion 27 that is screwed onto the threaded end of the piston rod and is of smaller diameter than the cup-shaped portion 26 so as to provide an annular space between the cylinder 13 and the portion 27.

The piston portion 26 is slidable in the inner cylinder 13 and is provided on its circumference with a plurality of axially extending circularly spaced grooves 28 and which grooves cooperate with the inner wall of the cylinder 13 to provide fluid passages. The bottom of the cup-shaped portion 26 of the piston 22 is provided with a central bore 29, the lower end of which is defined by an annular seat or rib 30 constituting a valve seat for a disk valve 31. The disk valve is slidable on a valve pin 32 the lower enlarged end of which is secured to a cup-shaped retaining member 33 that is fastened within the cup-shaped portion 26 of the piston in a manner later to be described. A coil spring 34 surrounds the valve pin 32 and abuts the valve disk 31 and the retaining member 33 and functions to normally maintain said disk seated on the valve seat 30.

The tubular portion 27 of the piston 22 is provided on its periphery with circularly spaced axially extending grooves 35 while radially extending ports 36 connect said grooves 35 with the bore in the tubular portion 27, it being understood that said bore communicates with the central opening or bore 29 in the bottom of the cup-shaped portion 26 of the piston. A resilient O-ring 37 is supported on a carrier 38 that is slidable on the exterior of the tubular portion 27 of the piston and said O-ring on one side engages a flange of the carrier and on the other side a rigid ring disk 39. The O-ring 37, carrier 38 and ring disk 39 are held by a coil spring 40 in the position shown in Fig. 1, said spring 40 surrounding the tubular portion 27 of the piston 22 with one of its ends abutting the carrier 38 and its other end abutting a washer 41 screwed on the piston rod 20 and engaging the upper end of the tubular portion 27 of the piston 22, said washer 41 being provided with a plurality of openings. The piston 22 may be provided with one or more bleed openings 42 as desired or as necessary. The construction of the shock absorber thus far given is conventional and its mode of operation is clearly set forth in my Patent 2,507,267, issued May 9, 1950.

The hydraulic compression stop and rebound delay mechanism embodying the present invention and constituting a built-in structural part of the shock absorber will now be described. The interior of the cup-shaped portion 26 of the piston 22 is threaded and has screwed into it the threaded upper end of a cylinder 43 with said upper end of the cylinder 43 engaging an outturned flange on the retaining member 33 and functioning to hold said retaining member 33 and the recoil valve assembly carried thereby in position within the cup-shaped portion 26 of the piston.

It will be clear that the cylinder 43 which constitutes one of the stop elements of the hydraulic compression stop and rebound delay mechanism moves with the piston during the operative movement of the latter in the working or pressure cylinder 13.

The lower end of the cylinder 13 has secured in it a compression head or plate 44 provided with an opening 45 which is controlled by a spring-pressed impact or compression valve assembly 46. The compression head 44 is provided with a second opening that is controlled by a spring-pressed recoil or replenishing valve assembly 47. The compression or impact valve assembly 46 and the recoil or replenishing valve assembly 47 are well known in the art and the manner in which said assemblies and the compression head 44 function during the operation of the shock absorber need not be set forth at length herein.

A second stop element in the form of a cup 48 is provided at its closed end with a circumferential radially extending flange 49 which interfits the interior of the cylinder 13 and engages a shoulder formed interiorly of the cylinder 13 and is held in such engagement with said shoulder by the compression head 44.

The lower closed end of the stop cup element 48 is provided with a centrally disposed bore or port 50 extending from the interior of the cup element 48 to an enlarged annular recess 51 formed in said element within the flange 49 and overlying the compression head 44. The flange 49 of the cup 48 is provided with a plurality of circularly spaced passages 52 communicating with the recess 51 and with the annular space between the sleeve 43 and the interior of the cylinder 13 when said sleeve 43 and the cup 48 are in telescoping engagement.

The cup element 48 is of a diameter such that it will slidably interfit the cylinder element 43. It will be understood that the length of the elements 43 and 48 will be predetermined in accordance with the portion of the impact or compression stroke it is desired to have the hydraulic compression stop action take place.

The cylinder element 43 is shown as provided with a port or bleed hole 53 adjacent the free or lower end of the element and with a smaller port or bleed hole 54 spaced longitudinally from the larger bleed hole 53 and toward the piston 22. It will be understood that the location of the bleed holes or ports and the capacity or size thereof as well as the number of the bleed holes or ports can vary to provide the hydraulic stop resistance desired.

Likewise it will be understod that different operating characteristics can be obtained from the stop and rebound delay mechanism not only by changing the size, number and location of the bleed holes in the element 43 but also by varying the size of the port 50 in the bottom of the cup-shaped element 48.

As already stated, if it is desired to have the stop action occur during the major part of the impact or compression stroke of the piston then the elements 43 and 48 can be lengthened so as to start their telescoping relationship earlier in the impact stroke.

It will be understood that by varying the size, number and location of the bleed holes in the element 43 and the size of the port 50 in the element 48 as well as the length of the two elements that an infinite number of different operating characteristics can be imparted to the shock absorber.

Now assuming that the shock absorber has the cylinder 13 filled with oil and the reservoir 15 partially filled and the shock absorber is connected to the frame and axle of a vehicle its operation will be as follows: When the vehicle wheel strikes an obstruction which raises the wheel and compresses the vehicle spring the piston will start its downward or impact or compression stroke in the cylinder 13. When the resistance of the oil to this impact stroke of the piston overcomes the action of the spring 40 on the O-ring 37 the latter will move away from the portion 26 of the piston and oil will be free to flow from the lower side of the piston to the upper side thereof through the grooves 28 as indicated in Fig. 2.

The oil which has flowed from the upper side of the piston through the grooves 28 to the lower side thereof in a volume corresponding to the volume of the oil displaced by the piston rod can flow through the port 50 and openings 52 and into the recess 51 of the stop cup member 48 and thence to the reservoir 15 through the impact valve 46. This mode of operation is will understood and need not be defined in greater detail.

Now referring to Fig. 2, it will be noted that at a certain point in the downward or impact stroke of the piston the cup-shaped stop element 48 will start to telescope within the sleeve element 43, the point in the impact stroke at which this occurs depending upon the selected predetermined length of the two elements.

When the piston has moved to the position shown in Fig. 2 the interiors of the cup-shaped element 48 and of the sleeve element 43 will be filled with oil due to the bleed holes 54 and 53 still being open and the interiors of the elements having been and still being in communication with the pressure or working chamber. When the piston 22 moves farther in its impact or compression stroke from the position shown in Fig. 2 to the position shown in Fig. 3 then the larger bleed hole 53 is covered by the cup-shaped element 48 and the oil which is within the interiors of the telescoping elements can only flow therefrom through the port 50 of the element 48 and through the smaller bleed hole 54 of the element 43. This means that the oil within the interiors of the two telescoping elements is trapped to a large extent and offers increased resistance to the further movement of the piston in the impact or compression stroke.

Now assuming that the piston 22 continues its impact or compression stroke from the position shown in Fig. 3 to the position shown in Fig. 4 then the cup-shaped element 48 will have closed the smaller bleed hole 54 as well as the larger bleed hole 53 and the trapped oil within the interiors of the two stop elements can only escape through the port 50 of the element 48. Consequently a still greater resistance is created by the trapped oil to the further movement of the piston in its impact or compression stroke and therefore from the moment that the bleed hole 54 is covered until the piston has moved its maximum distance in the direction of its impact stroke there is substantially a hydraulic lock created within the interiors of the two elements that resists the further movement of the piston in the impact or compression direction.

It will be noted that the increased hydraulic resistance or pressure takes place within the interiors of the two stop elements and hence the cylinder 13 is not subject to these high pressures as they are confined within the stop elements.

Now assuming that the area in the working chamber above the piston is greater than the area within the stop elements then as soon as the vehicle springs expand and the piston starts its upward, rebound or recoil stroke the recoil valve 31 will open the oil passing through the piston will fill the interiors of the telescoped stop elements to overflowing and this results in retarding the flow of oil through the piston and gives rebound resistance or delay at the initial portion of the rebound stroke of the piston. This rebound resistance continues with that portion of the rebound stroke equal to the length of telescoping engagement between the stop elements, but as the piston continues in its rebound stroke such rebound resistance or delay lessens as the bleed holes 54 and 53 are successively uncovered and until the telescoping elements are disengaged from each other.

It will be understood that on the rebound stroke the replenishing valve 47 will open to allow oil to flow into the working chamber to compensate for the lessening area of the piston rod that is within the working chamber.

In Figs. 5 and 6 a modified form of hydraulic compression stop and rebound delay mechanism embodying the invention is illustrated. However, insofar as the parts of this modified mechanism correspond to the parts of the mechanism previously described they are given the same reference numeral identification with the exponent $a$ added thereto.

In the modified construction the cylindrical stop element 43a is not provided with any bleed openings. The cup-shaped stop element 48a is provided on its circumference with a longitudinally extending groove 55 which is of gradually varying depth and capacity throughout its length, with the deepest portion thereof being located at the outer or free end of the cup-shaped element 48a and its shallowest portion located adjacent the opposite end of said element.

It will be understood that the groove 55 provides a bleed passage between the element 43a and the element 48a and that as soon as said elements start to telescope said passage functions. During the initial telescoping engagement of the elements 43a and 48a the passage will have its greatest bleeding capacity and as said elements continue to telescope the bleeding capacity of the passage will gradually diminish until when the elements are fully telescoped the passage is substantially closed.

The bleed passage 55 performs the same function as the bleed holes 53 and 54 except that the passage 55 progressively and continuously causes the pressure within the stop elements to build up between minimum and maximum during the impact stroke whereas when the spaced bleed holes are used the pressure builds up with a step or stage-like increase instead of the smooth gradual continuous increase. The same difference exists between the functioning of the passage 55 and the functioning of the bleed holes 53 and 54 during the rebound stroke, that is the rebound resistance or delay gradually and continuously and smoothly lowers in the instance of the passage, while in the construction employing the bleed holes it lowers in separate stages or steps.

From the foregoing description it will be readily seen that the mechanism embodying the invention can provide a wide selection of hydraulic resistance on the compression stroke and rebound resistance or delay on the recoil stroke by predetermined variations in the capacities of the bleed holes or the bleed passage and in the capacity of the port 50 in the cup-shaped element. Also the portion or duration of the stop and delay actions during the compression and rebound piston strokes can be varied by varying the length of the telescoping elements so that they will start telescoping earlier or later in the impact stroke and will disengage earlier or later in the recoil stroke. Consequently the mechanism of the present invention can be utilized in a shock absorber to give the shock absorber an almost infinite number of different operating characteristics.

Although several preferred embodiments of the invention have been illustrated and described herein it will be understood that the invention is susceptible of various modifications and adaptations within the scope of the appended claims.

Having thus described my invention, I claim:

1. A direct double acting hydraulic shock absorber having a cylindrical working chamber closed at one end and provided with a compression head at its other end and communicating with a reservoir through a compression passage and a replenishing passage in said head and in which working chamber is a reciprocating piston connected on its side that is adjacent to said closed end of said chamber to a piston rod extending outwardly of the chamber through said closed one end thereof, said piston being provided with separate valve controlled passages for the oil to flow past the piston during the compression or impact piston stroke and during the recoil or rebound piston stroke, and a hydraulic compression stop and rebound delay mechanism located entirely on the side of the piston adjacent to said compression head and comprising two stop elements having telescoping relationship during portions of the compression and rebound piston strokes and separated relationship during other portions of said strokes, one of said elements being connected to the piston on the side thereof that is adjacent to said compression head and communicating with the valve controlled passage in the piston for the oil to flow past the piston during the recoil or rebound piston stroke and the other of said elements being fixed with respect to said compression head and extending from adjacent the latter toward said piston connected element, said elements being provided with bleed means variable in capacity during the telescoping engagement of said elements as the piston moves in portions its compression or recoil strokes.

2. A direct double acting hydraulic shock absorber as defined in claim 1 and wherein said bleed means includes bleed ports spaced longitudinally of one of said stop elements.

3. A direct double acting hydraulic shock absorber as defined in claim 1 and wherein said bleed means consists of bleed ports spaced longitudinally of one of said stop elements and a bleed port in the other of said stop elements.

4. A direct double acting hydraulic shock absorber as defined in claim 1 and wherein said bleed means includes bleed ports of different sizes spaced longitudinally of one of said stop elements.

5. A direct double acting hydraulic shock absorber as defined in claim 1 and wherein said bleed means consists of bleed ports of different sizes spaced longitudinally of one of said stop elements and a bleed port in the other of said stop elements.

6. A direct double acting hydraulic shock absorber as defined in claim 1 and wherein said bleed means includes a groove formed in the surface of one of said stop elements which engages the other stop element and which groove extends longitudinally of said elements and has a gradually variable cross sectional area from end to end.

7. A direct double acting hydraulic shock absorber as defined in claim 1 and wherein said one element is a sleeve connected to the piston on the compression side thereof and said other element is a cup-shaped member having its bottom spaced from said compression head.

8. A direct double acting hydraulic shock absorber as defined in claim 7 and wherein said bleed means includes longitudinally spaced bleed ports in one of the stop elements which successively are covered or uncovered by the other stop element as the two elements telescopically move relative to each other.

9. A direct double acting hydraulic shock absorber as defined in claim 7 and wherein said sleeve telescopes upon said cup-shaped member, while said bleed means consists of bleed ports in and spaced longitudinally of said sleeve and a bleed port in the bottom of said cup-shaped member.

10. A direct double acting hydraulic shock absorber as defined in claim 7 and wherein said bleed means includes a groove extending longitudinally of one of said elements and gradually varying in cross-sectional area from end to end and cooperating with the other element when said elements are in telescoping relationship to provide a variable capacity bleed passage between the elements.

11. A direct double acting hydraulic shock absorber as defined in claim 10 and wherein said bleed means consists of said groove in one of said elements and of a bleed port in the bottom of said cup-shaped member.

References Cited in the file of this patent

UNITED STATES PATENTS

| 845,827 | Steedman | Mar. 5, 1907 |
| 1,792,695 | Lewis | Feb. 17, 1931 |
| 2,487,471 | Patriquin | Nov. 8, 1949 |

FOREIGN PATENTS

| 822,278 | France | Sept. 13, 1937 |
| 995,585 | France | Aug. 22, 1951 |